March 15, 1932.  F. E. ENSLEY  1,849,617
METHOD OF AND APPARATUS FOR CONSTRUCTING MULTIPLY ARTICLES
Filed Feb. 9, 1928
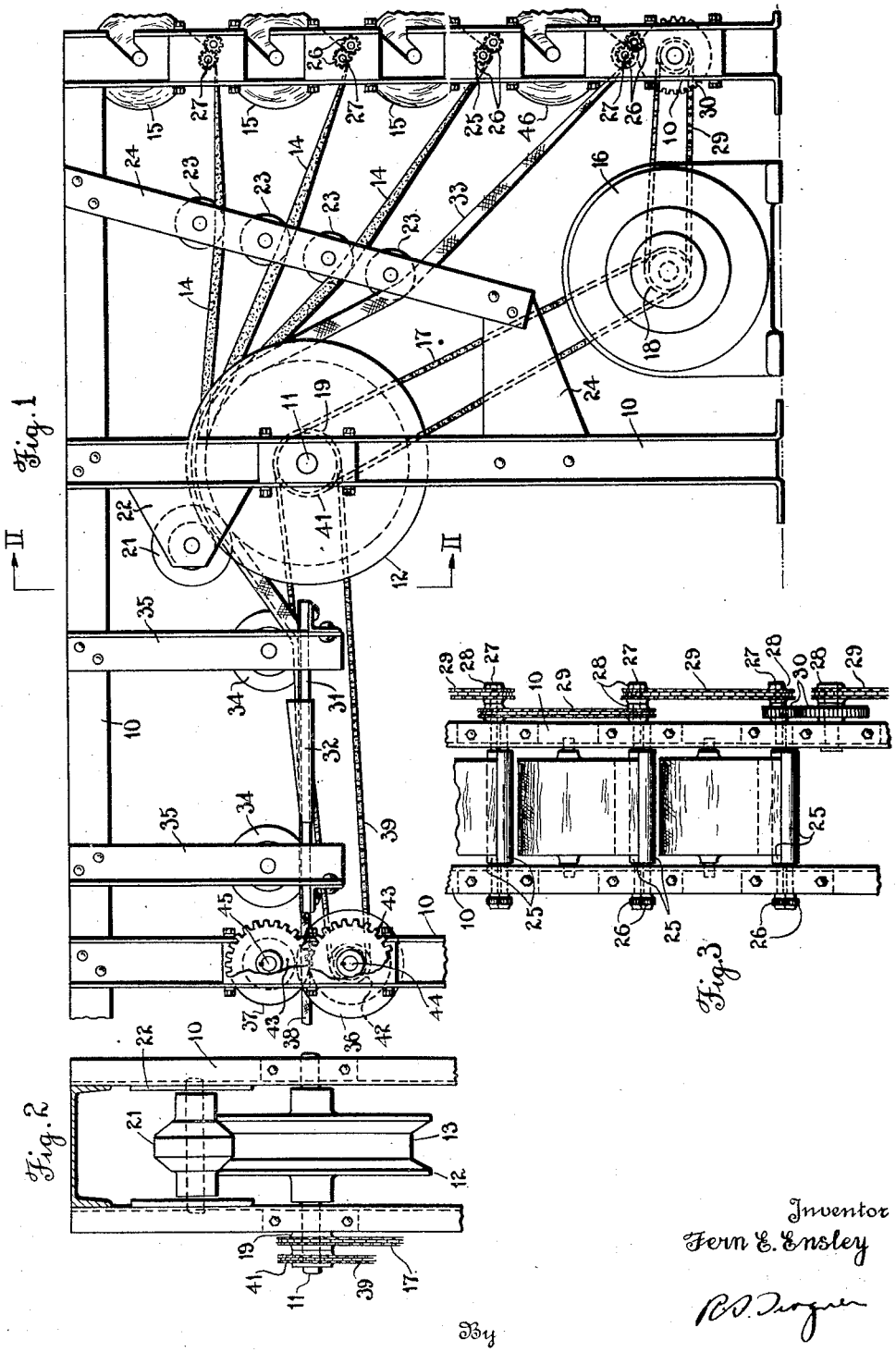
Inventor
Fern E. Ensley
By
Attorney Patented Mar. 15, 1932

1,849,617

UNITED STATES PATENT OFFICE

FERN E. ENSLEY, OF AKRON, OHIO, ASSIGNOR TO THE GOODYEAR TIRE & RUBBER COMPANY, OF AKRON, OHIO, A CORPORATION OF OHIO

METHOD OF AND APPARATUS FOR CONSTRUCTING MULTIPLY ARTICLES

Application filed February 9, 1928. Serial No. 253,061.

This invention relates to laminated fabrics and it has particular relation to a method of and an apparatus for forming and assembling multi-ply fabric articles which shall be especially adapted for the manufacture of tire flaps.

In accordance with the present practice, the several plies which are united to form tire flaps are superposed in a flat assembly and then forced into spiral grooves provided in the peripheral surface of a drum to mold them into channel shape. This method presents a very serious problem in that the shaping of the flap material after the several plies thereof have been united causes stresses in the flaps which are undesirable. Such disadvantage arises because the plies are attached together by their friction coating and resultant stresses are, therefore, caused in the flap by the shaping operation.

Other stresses are created in the flap by longitudinal curvature thereof to accomodate it to fit within a tire casing. Since the superposed plies of fabric cannot adjust themselves to compensate for these stresses, either the base portion of the flap buckles or the edge portions assume the shortest circumference possible and cause longitudinal wrinkles in the flap. The stresses caused by shaping the flaps after the plies thereof have been secured together render at least ten percent of the flaps so constructed unfit for use.

The primary object of this invention is to overcome the above mentioned difficulties by the provision of a method and an apparatus whereby the individual plies of which the flaps are constructed are pre-formed, both transversely and longitudinally, before they are secured together.

For a better understanding of the invention, reference may now be had to the accompanying drawings forming a part of this disclosure, in which:

Figure 1 is a side elevational view of an apparatus embodying the novel features of the invention;

Figure 2 is a cross-sectional view, taken substantially along the line II—II of Figure 1; and Figure 3 is a fragmentary end elevational view illustrating the manner in which the ply material is removed from the supply rolls.

In the embodiment of the invention illustrated in the accompanying drawings, a frame 10 rotatably supports a shaft 11, upon which is mounted a wheel 12 which is peripherally grooved, as indicated at 13, to receive and shape a plurality of plies 14 of flap material fed thereto from supply rolls 15 removably carried by the frame. A motor 16 serves to drive the wheel 12 through the agency of a chain 17 engaging a sprocket wheel 18 on the shaft of the motor and a sprocket wheel 19 keyed to the shaft 11.

A roller 21, rotatably supported by brackets 22 secured to the frame 10, is so formed as to coact with the wheel 12 by compressing the plies 14 into the groove 13 to unite them. The surface of the roller 21 preferably is composed of comparatively soft rubber better to adapt it to function as a pressure roller.

A plurality of idler rollers 23 are rotatably supported in spaced relation intermediate the rollers 15 and the wheel 12, by means of frame members 24, and serve to engage the individual strips 14 to predetermine the points at which the respective strips shall enter the groove 13 in the wheel. The peripheries of the rollers 23 are shaped to impart to the strips passing thereunder the transversely curved shape which is desired in the finished flap.

Pairs of small guide rollers 25 are preferably provided directly beneath each of the rolls 15 to expedite removal of the strips 14 from the rolls. As shown, the rollers 25 of each pair are geared together by coacting pinions 26, to rotate at equal speeds in opposite directions and a shaft 27 of one of the rollers of each pair is positively driven from the motor 16 by sprockets 28, chains 29, and gears 30 calculated to cause the rollers 25 and the wheel 12 to rotate at equal peripheral speeds.

After the several plies 14 have been united by the coaction of the roller 21 and the wheel 12, they are fed to a bent supporting plate 31 which has associated therewith a folder 32 which engages the edges of a flannel strip 33 and folds them around the edges of the plies 14. Idler rollers 34 rotatably supported by depending frame members 35 engage the flap to maintain it within the bent plate 31. A pair of coacting drive rollers 36 and 37, rotatably mounted upon the frame 10 and peripherally shaped to conform to the contour of the flap material, aid the wheel 12 and roller 21 in conveying the strips 14 from the rolls 15 and feed the completely formed flap 38 in continuous length from the apparatus.

A chain 39, passing over a sprocket wheel 41 keyed to the shaft 11 and a similar sprocket wheel 42 keyed to the shaft of the roller 36, drives the latter roller, and coacting gears 43 of suitable size, mounted on shafts 44 and 45 which carry the respective rolls 36 and 37, cause the latter to rotate at equal peripheral speed.

In practising the invention, the rolls 15 of frictioned fabric and a roll 46 of the flannel strip 33, which is somewhat wider than the frictioned fabric, are mounted in superimposed relation on the frame 10. The strips 14 and 33 are then fed beneath the respective rollers 23 into the groove 13 of the wheel 12 and between the wheel 12 and roller 21, after which the motor 16 is energized to cause a continuous feeding of the strips. The united plies are then fed between the rollers 34 and the plate 31 and to the folder 32 intermediate these rollers. As soon as the leading ends of the strips have passed between the rollers 36 and 37, the latter serve to aid in the feeding of the flap.

It will be observed that the rollers 23 will cause the strips 14 and 33 to assume approximately the desired transverse sectional form as they pass thereunder. The final shaping of the united plies is accomplished on the wheel 12 which is preferably of such diameter, as substantially to conform to the size of the tire with which the flap is to be associated in use.

The rollers 23 also cause the several strips to engage the peripheries of the wheel 12 at spaced points, whereby each ply is longitudinally and cross-sectionally curved to its ultimate form before the several plies are united. Since the rollers 36 and 37 are positively driven and the small rollers 25 free the green material from the rolls 15, the tension on the material being treated by the apparatus is at a minimum value during the entire operation.

Although I have illustrated only one form which the invention may assume and have described in detail only a single application thereof, it will be apparent to those skilled in the art that the invention is not so limited, but that various minor modifications may be made therein without departing from the spirit of the invention or from the scope of the appended claims.

What I claim is:

1. The method of forming multi-ply strip articles by means of a forming drum which includes feeding a plurality of strips of ply material to the drum at circumferentially spaced points, rotating the drum to cause each ply separately to assume a longitudinally curved form, applying pressure to the curved plies to unite them, and folding the edge portions of an outer ply around the edges of the remaining plies.

2. An apparatus for assembling multi-ply material comprising means for supplying a plurality of strips of material, means for uniting the strips, means interposed between the supplying means and the uniting means for transversely pre-forming the strips, and means for folding the edge portions of one of the strips about the edges of the remaining strips.

3. An apparatus for assembling multi-ply material comprising a frame, means for supporting a plurality of rolls of ply material carried by the frame, a grooved wheel journalled in the frame, means for rotating the wheel, means for feeding the strips from the supply rolls to the wheel, means for compressing and uniting the strips in the groove, and guide rollers carried by the frame for engagement with the individual strips to preform them transversely and to cause the strips to enter the grooves at spaced points.

4. An apparatus for assembling multi-ply material comprising a frame, means for supporting a plurality of rolls of ply material carried by the frame, a grooved wheel journalled in the frame, means for rotating the wheel, means for feeding the strips from the supply rolls to the wheel, means for compressing and uniting the strips in the groove, guide rollers carried by the frame for engagement with the individual strips to preform them transversely and to cause the strips to enter the grooves at spaced points, and means for folding the edge portions of one of the plies about the edges of the remaining plies.

In witness whereof, I have hereunto signed my name.

Signed at Akron, in the county of Summit and State of Ohio, U. S. A., this 8th day of February, 1928.

FERN E. ENSLEY.